US011853942B2

(12) United States Patent
Anderson

(10) Patent No.: US 11,853,942 B2
(45) Date of Patent: Dec. 26, 2023

(54) SYSTEM AND METHOD OF RIDESHARING PICK-UP AND DROP-OFF

(71) Applicant: Nicholas Anderson, Knoxville, TN (US)

(72) Inventor: Nicholas Anderson, Knoxville, TN (US)

(*) Notice: Subject to any disclaimer, the term of this patent is extended or adjusted under 35 U.S.C. 154(b) by 602 days.

(21) Appl. No.: 16/846,831

(22) Filed: Apr. 13, 2020

(65) Prior Publication Data

US 2020/0327472 A1 Oct. 15, 2020

Related U.S. Application Data

(60) Provisional application No. 62/916,393, filed on Oct. 17, 2019, provisional application No. 62/833,081, filed on Apr. 12, 2019.

(51) Int. Cl.
*G06Q 10/02* (2012.01)
*G06Q 10/0631* (2023.01)
(Continued)

(52) U.S. Cl.
CPC ... *G06Q 10/06315* (2013.01); *G01C 21/3438* (2013.01); *G06Q 10/02* (2013.01);
(Continued)

(58) Field of Classification Search
CPC .... G01C 21/3438; G06Q 10/02; G06Q 50/30; G06Q 2240/00
See application file for complete search history.

(56) References Cited

U.S. PATENT DOCUMENTS 5,373,282 A   12/1994  Carter
7,840,427 B2  11/2010  O'Sullivan
(Continued)

FOREIGN PATENT DOCUMENTS

RU   2016134825      5/2018
WO   WO2002103640   12/2002
(Continued)

OTHER PUBLICATIONS

Deakin, Elizabeth, et al., "Dynamic Ridesharing", Apr. 1, 2012, UC Berkeley Access Magazine, Issue 40, pp. 23-28 (Year: 2012).*
(Continued)

*Primary Examiner* — Jeff Zimmerman
*Assistant Examiner* — Wayne S. Murray
(74) *Attorney, Agent, or Firm* — Robinson IP Law, PLLC

(57) ABSTRACT

A method of assigning a space for a ride-share vehicle includes: providing a rideshare parking space management server; providing data corresponding to a parking space available for use by a rideshare vehicle; receiving a request for one of a pick-up or drop-off of a rideshare passenger from one of a passenger device, driver device, autonomous rideshare vehicle, or rideshare server; assigning the parking space to the rideshare vehicle; transmitting with the processor a parking space code corresponding to the assigned parking space to one of a driver device, the autonomous rideshare vehicle, or rideshare server; transmitting the parking space code corresponding to the assigned parking space to a passenger device; displaying the parking space code corresponding to the request for one of a pick-up and drop-off of the rideshare passenger on the passenger device.

14 Claims, 5 Drawing Sheets

(51) Int. Cl.
  *G06Q 50/30* (2012.01)
  *G06Q 20/08* (2012.01)
  *G06Q 20/14* (2012.01)
  *G01C 21/34* (2006.01)

(52) U.S. Cl.
  CPC ..... *G06Q 10/06314* (2013.01); *G06Q 20/085* (2013.01); *G06Q 20/145* (2013.01); *G06Q 50/30* (2013.01); *G06Q 2240/00* (2013.01)

(56) References Cited

U.S. PATENT DOCUMENTS

| | | | |
|---|---|---|---|
| 9,194,168 | B1 | 11/2015 | Lu et al. |
| 9,442,888 | B2 | 9/2016 | Stanfield et al. |
| 10,043,396 | B2 | 8/2018 | Salter et al. |
| 2005/0286421 | A1* | 12/2005 | Janacek ............... H04W 4/029 370/231 |
| 2010/0152961 | A1 | 6/2010 | Atri et al. |
| 2010/0152976 | A1 | 6/2010 | White et al. |
| 2014/0058896 | A1 | 2/2014 | Jung |
| 2015/0324708 | A1 | 11/2015 | Skipp et al. |
| 2015/0339928 | A1 | 11/2015 | Ramanujam |
| 2015/0346727 | A1 | 12/2015 | Ramanujam |
| 2015/0369621 | A1 | 12/2015 | Abhyanker |
| 2016/0027079 | A1 | 1/2016 | Schoeffler |
| 2016/0055699 | A1 | 2/2016 | Vincenti |
| 2017/0186324 | A1 | 6/2017 | Fish et al. |
| 2017/0213165 | A1 | 6/2017 | Stauffer et al. |
| 2017/0267233 | A1* | 9/2017 | Minster ............... B62D 15/02 |
| 2017/0294130 | A1 | 10/2017 | Donnelly |
| 2017/0316533 | A1 | 11/2017 | Goldman-Shenhar et al. |
| 2018/0053276 | A1 | 2/2018 | Iagnemma et al. |
| 2018/0321685 | A1* | 11/2018 | Yalla ..................... G08G 1/147 |
| 2019/0243368 | A1* | 8/2019 | Seki ............... B60W 60/00253 |
| 2019/0272682 | A1* | 9/2019 | Qian ..................... G08G 1/148 |

FOREIGN PATENT DOCUMENTS

| | | |
|---|---|---|
| WO | WO2005086097 | 9/2005 |
| WO | WO2015005948 | 1/2015 |
| WO | WO2015099679 | 7/2015 |
| WO | WO2018097813 | 5/2018 |

OTHER PUBLICATIONS

International Search Report and Written Opinion of the International Search Authority, International Application No. PCT/US20/27923 (dated Jul. 17, 2020).

* cited by examiner

SYSTEM AND METHOD OF RIDESHARING PICK-UP AND DROP-OFF

CROSS-REFERENCE TO RELATED APPLICATION

This application claims priority to and is a non-provisional of U.S. Provisional Patent Application Ser. No. 62/833,081 for a "System and Method of Ridesharing Pick-up and Drop-off" filed on Apr. 12, 2019, and U.S. Provisional Patent Application Ser. No. 62/916,393 for a "System and Method of Ridesharing Pick-up and Drop-off" filed on Oct. 17, 2019, the contents of which are incorporated herein by reference in its entirety.

FIELD

This disclosure relates to the field of transportation. More particularly, this disclosure relates to systems and methods of facilitating pick-up and drop-off of passengers using a ridesharing service.

BACKGROUND

Ridesharing provides an effective means of transportation wherein a passenger may summon a vehicle for transportation of the passenger, such as by using a smartphone of the passenger. The vehicle transports the rider and the rider pays for the transportation, typically using an application on the user's smartphone.

While ridesharing has become a popular method of transportation, hazards and difficulties exist with respect to summoning a private vehicle for transportation. For example, situations have arisen in which a passenger enters a vehicle that is not a ridesharing vehicle on the mistaken belief that the vehicle was summoned by the passenger. Additionally, a passenger may enter a rideshare vehicle which is not the specific rideshare vehicle they summoned. Further, it can be difficult for both passengers and drivers/vehicles to locate one another, particularly in crowded areas such as airports, sports venues, and other similar locations where multiple rideshare vehicles may be completing multiple simultaneous pick-ups and drop-offs. Furthermore, in the absence of available, designated parking spaces for pick-up and drop-off for rideshare vehicles, rideshare vehicles may pick-up or drop-off passengers in a location or manner which impedes vehicle or pedestrian traffic or otherwise creates a safety hazard. Moreover, rideshare vehicles may not be able to pick-up or drop-off passengers at all due to a lack of appropriate and available parking spaces in the area of the requested pick-up or drop-off. Many of these problems will be exacerbated as human-driven rideshare vehicles are replaced by autonomous rideshare vehicles.

What is needed, therefore, is a system and method to locate and assign available designated parking spaces for the pick-up and drop-off of rideshare passengers and facilitate the identification of an assigned ridesharing vehicle by the passenger.

SUMMARY

What is needed, therefore is a system and method to locate and assign available designated parking spaces for the pick-up and drop-off of rideshare passengers and facilitate the identification of an assigned ridesharing vehicle by the passenger. In a first aspect, a method of assigning a space for a ride-share vehicle includes: providing a rideshare parking space management server having a processor and memory; providing a database on a server including data corresponding to at least one parking space available for use by a rideshare vehicle stored on the memory of the rideshare parking space management server; receiving a request for one of a pick-up or drop-off of a rideshare passenger from one of a passenger device, driver device, autonomous rideshare vehicle, or rideshare server; assigning with the processor one of the at least one parking space to the rideshare vehicle corresponding to the request for one of a pick-up or drop-off of the rideshare passenger; transmitting with the processor a parking space code corresponding to the assigned parking space to one of a driver device, the autonomous rideshare vehicle, or rideshare server in communication with the rideshare parking space management server; transmitting with the processor the parking space code corresponding to the assigned parking space to a passenger device in communication with the rideshare parking space management server; displaying the parking space code corresponding to the request for one of a pick-up and drop-off of the rideshare passenger on the passenger device.

In one embodiment, the method further includes: providing a rideshare provider server in electronic communication with the rideshare parking space management server. Transmission of the parking space code corresponding to the assigned parking space to one of the driver device, the autonomous rideshare vehicle, or the rideshare server and transmission of the parking space code to the passenger device is via the rideshare provider server.

In another embodiment, the method further includes providing data corresponding to a plurality of rideshare parking spaces, wherein the processor of the rideshare parking space management server assigns one of the plurality of rideshare parking spaces to the rideshare vehicle corresponding to the request.

In yet another embodiment, assigning the processor one of the at least one parking space to the rideshare vehicle corresponding to the request for one of a pick-up or drop-off of the rideshare passenger and transmitting with the processor the parking space code is performed on the rideshare provider server.

In one embodiment, the method further includes displaying the parking space code proximate to the parking space assigned to the rideshare vehicle corresponding to the request for one of a pick-up and drop-off of the rideshare passenger. In another embodiment, the parking space code is dynamic and wherein the parking space code is displayed on a dynamic display. In yet another embodiment, the parking space code is static and wherein the parking space code is displayed on a static display.

In one embodiment, a location of the assigned parking space is transmitted to the one of the driver device, the autonomous rideshare vehicle, or the rideshare server, wherein the location corresponds to a physical location of the assigned parking space.

In another embodiment, the method further includes receiving data on the rideshare parking space management server corresponding to characteristics of the at least one parking space selected from the group consisting of at least one of dates of availability of the at least one parking space, times of availability of the at least one parking space, geographic location of the at least one parking space, a street address of the at least one parking space, proximity of the at least one parking space to businesses, proximity of the at least one parking space to residences, one of a lot number and letter, one of a row number and letter, parking garage floor designation, and information corresponding to a location at an airport or train station terminal, wherein assignment of the at least one parking space is based on one of the dates of availability, times of availability, and geographic location of the at least one parking space.

In yet another embodiment, the method further includes assigning a master label to the assigned parking space and assigning a display label to the assigned parking space, wherein the display label has a character length that is less than a character length of the master label. In one embodiment, the master label is uniquely associated with the assigned parking space and wherein the display label may be used on a second assigned parking space.

In another embodiment, the same display label is associated with a first of the assigned parking space and the second assigned parking space when the second parking space is determined to be in a different geographic location from the first of the assigned parking space.

In yet another embodiment, the method further includes determining a route to the assigned parking space for the ride-share vehicle.

In one embodiment, the method further includes providing a user interface for receiving location information of a parking space entered by a user and storing data of the received parking space on the database on the server.

In another embodiment, the method further includes receiving availability data of the received parking space, the availability data selected from the group consisting of days of availability, times of availability, businesses located in proximity to the received parking space, and a label associated with the received parking space.

In yet another embodiment, the method further includes providing a label of the assigned parking space viewable in proximity to the assigned parking space, wherein the label is readable on one or more sensors of the ride-share vehicle.

In one embodiment, the parking space code of the at least one parking space assigned to the ride-share vehicle is transmitted to both a first user device corresponding to a first passenger user and a second user device corresponding to a second passenger user.

In another embodiment, the method further includes storing data corresponding to a fee in association with the at least one parking space available for use by the rideshare vehicle.

In a second aspect, a method of assigning a space for a ride-share vehicle includes: providing a rideshare parking space management server having a processor and memory; providing a database on a server including data corresponding to at least one parking space available for use by a rideshare vehicle stored on the memory of the rideshare parking space management server; receiving a request for one of a pick-up or drop-off of a rideshare passenger from one of a passenger device, driver device, autonomous rideshare vehicle, or rideshare server; assigning with the processor one of the at least one parking space to the rideshare vehicle corresponding to the request for one of a pick-up or drop-off of the rideshare passenger; transmitting with the processor a parking space code corresponding to the assigned parking space to one of a driver device, the autonomous rideshare vehicle, or rideshare server in communication with the rideshare parking space management server; transmitting with the processor the parking space code corresponding to the assigned parking space to a passenger device in communication with the rideshare parking space management server; displaying the parking space code corresponding to the request for one of a pick-up and drop-off of the rideshare passenger on the passenger device; and displaying the parking space code proximate to the parking space assigned to the rideshare vehicle corresponding to the request for one of a pick-up and drop-off of the rideshare passenger.

In a third aspect, a method of assigning a space for a ride-share vehicle includes: providing a rideshare parking space management server having a processor and memory; providing a database on a server including data corresponding to at least one parking space available for use by a rideshare vehicle stored on the memory of the rideshare parking space management server; receiving a request for one of a pick-up or drop-off of a rideshare passenger from one of a passenger device, driver device, autonomous rideshare vehicle, or rideshare server; assigning with the processor one of the at least one parking space to the rideshare vehicle corresponding to the request for one of a pick-up or drop-off of the rideshare passenger; transmitting with the processor a parking space code corresponding to the assigned parking space to one of a driver device, the autonomous rideshare vehicle, or rideshare server in communication with the rideshare parking space management server; transmitting with the processor the parking space code corresponding to the assigned parking space to a passenger device in communication with the rideshare parking space management server; displaying the parking space code corresponding to the request for one of a pick-up and drop-off of the rideshare passenger on the passenger device; and assigning a master label to the assigned parking space and assigning a display label to the assigned parking space, wherein the display label has a character length that is less than a character length of the master label.

BRIEF DESCRIPTION OF THE DRAWINGS

Further features, aspects, and advantages of the present disclosure will become better understood by reference to the following detailed description, appended claims, and the accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Throughout this disclosure, the terms "ridesharing" may refer, but is not limited to, car-sharing, ride-sharing, ride-hailing, and taxi services, and also including vehicles under autonomous control, human control, or a combination of both. Embodiments of the present disclosure may refer to use of a vehicle by individuals other than an owner of the vehicle and use of the terms "car-sharing", "ride-sharing", "ride-hailing", or "third-party utilization" are not intended to be limiting. The term "ride-share company" includes, but is not limited to, companies which provide car-sharing, ride-sharing, and ride-hailing services, transportation network companies, and other rideshare fleet operators. Throughout this disclosure the term "parking space" includes any physical location where a rideshare vehicle may pick up or drop off passengers. It is understood that various embodiments of the present disclosure may be suitable for both autonomous and non-autonomous vehicles.

Figure 1:
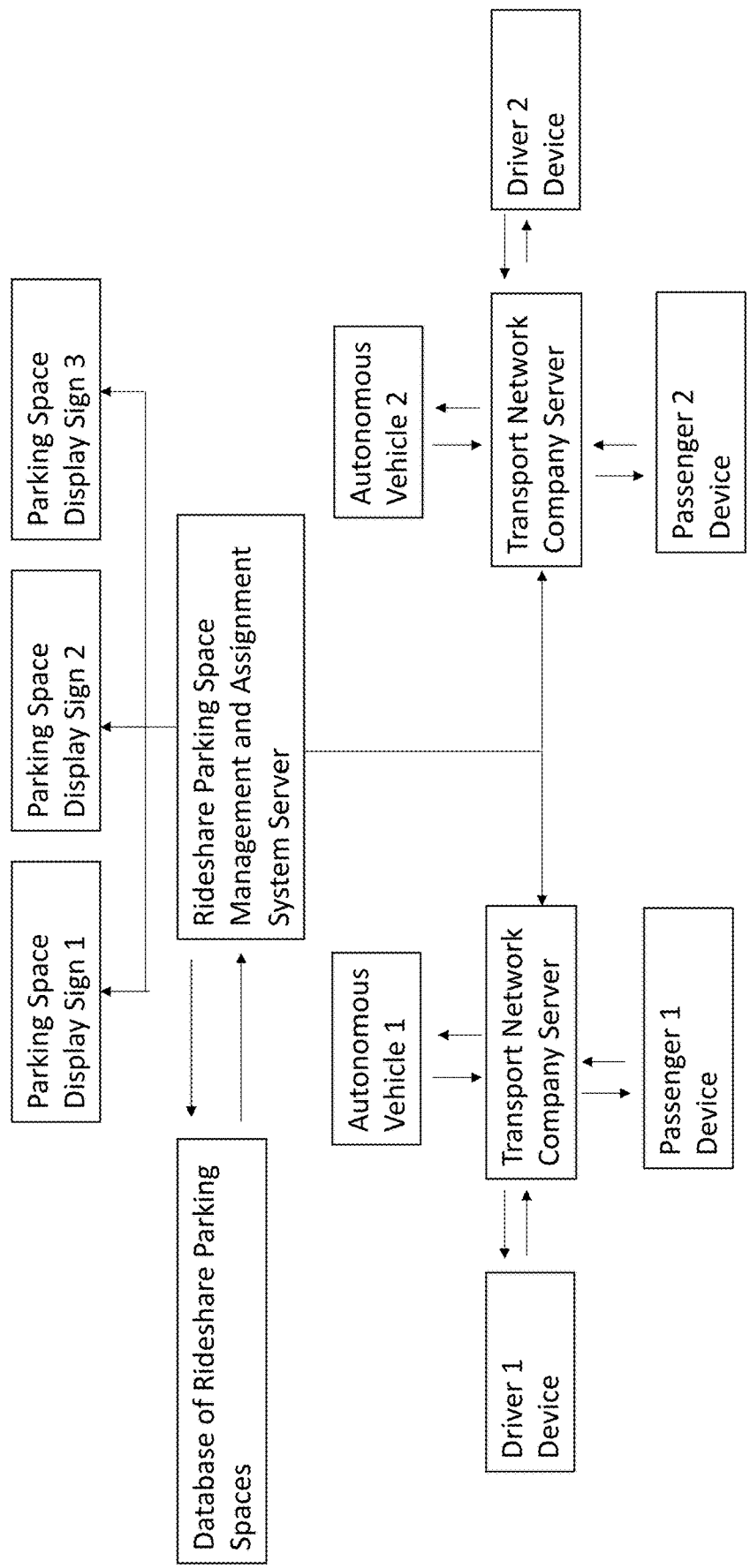
FIG. 1 shows a schematic diagram of a system for managing rideshare parking spaces according to one embodiment of the present disclosure.
Figure 2:
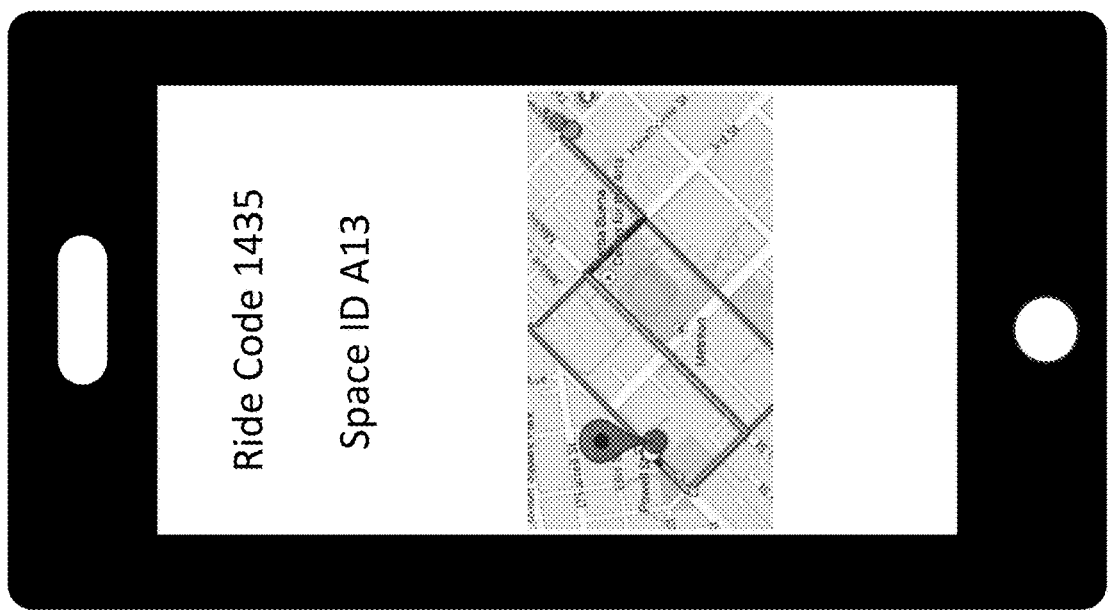
FIG. 2 shows a display of a user device including a ride code and space ID according to one embodiment of the present disclosure.

Embodiments of systems and methods of the present disclosure include the automated assignment of a designated, labeled, individual pick-up and/or drop-off parking space (also known as parking stall) for a specific rideshare trip of a passenger using a rideshare vehicle and/or a ridesharing service. As shown in FIG. 1, systems and methods herein include a rideshare passenger requesting a rideshare using a software application of a rideshare company on a passenger user device and inputs desired pick-up and drop-off location. The rideshare company software application transmits desired pick-up and drop-off location to rideshare company's computers and/or servers which manage and assign rideshares. A rideshare company server communicates pick-up and drop-off location data to a rideshare parking space management and assignment system hosted on a computer or server. The rideshare parking space management and assignment system selects an individual pick-up parking space and individual drop-off parking space in proximity to pick-up and drop-off locations requested by a rideshare passenger from a database of available rideshare parking spaces. The rideshare parking space management and assignment system communicates pick-up and drop-off parking spaces and associated labels and geolocation (such as GPS coordinates) to the rideshare company's computers and/or servers which manage and assign rideshares. As shown in FIG. 2, the rideshare company server transmits pick-up and drop-off parking space labels and geolocation to rideshare company software application on driver user device (and/or to a rideshare vehicle and/or to a remote computer system in control of or in communication with a rideshare vehicle) and rideshare company software application on passenger user device. The passenger and driver (and/or rideshare vehicle) proceed to the designated pick-up parking space. The passenger and driver/rideshare vehicle commence rideshare and transport to designated drop-off parking space where the passenger disembarks from the rideshare vehicle and the rideshare ends.

Embodiments include automated assignment of designated, labeled, individual pick-up and drop-off parking spaces for a rideshare trip and automated confirmation, transmission, and display of a pickup parking space label and location on a passenger user device and driver user device and/or rideshare vehicle and/or remote computer system in control of or in communication with a rideshare vehicle. In one embodiment, the designated parking space may be labeled with a physical sign adjacent to or on the space. Alternatively, the designated individual parking space may be labeled virtually without a physical sign using geolocation coordinates available to the driver user device and/or rideshare vehicle and/or remote computer system in control of or in communication with a rideshare vehicle and/or rideshare vehicle navigation system, as well as a passenger user device (such as a smartphone).

A further embodiment includes an electronic rideshare vehicle parking space management and assignment system implemented on one or more user devices, computers, and/or servers to locate available, designated, labeled parking spaces in proximity to the desired passenger pick-up and/or drop-off location and assign them to a specific rideshare trip. An additional embodiment includes a database of parking spaces designated for the use by rideshare vehicles, including labels and/or identification codes for each parking space, geolocation coordinates of each parking space, and other characteristics of each parking space such as days and hours of availability, associated street address (es), associated businesses, associated residences, associated places of interest, lot number/letter, row number/letter, parking garage floor designation, and information corresponding to a location at an airport or train station terminal such as terminal number, door number, etc. This electronic system and database may be integrated in to one or more rideshare company's computers and/or servers which manage and assign rideshares, or it may be separate from but in communication with one or more rideshare company's computers and/or servers which manage and assign rideshares.

Further embodiments may include a software application in communication with the rideshare parking space database and rideshare parking space management and assignment system that is separate from the rideshare company software application and installed on the passenger device, driver device, and/or rideshare vehicle.

In one embodiment, the rideshare parking space database and the computer system to manage and assign rideshare parking spaces may utilize a dual-labeling system to label each individual rideshare parking space in the database. For example, each individual parking space in the database may be assigned a unique "master" label or identification code to identify the parking space within the database. Additionally, each individual parking space may also be assigned a separate "display" code, such as a shorter code that may be easier to read or recall. For example, an individual parking space may be assigned a master label or identification code in the database of A2B8D4HK2, but may further be assigned an easier to read display label or identification code of A12. Multiple parking spaces in the database may have the same display label or identification code, while all master labels or identification codes are unique. A reference table may be used to relate display labels to master labels. In a further embodiment, the rideshare parking space management and assignment computer system may assign and transmit master labels or identification codes to rideshare company computers and/or servers which manage and assign rideshares, but the corresponding display label may be displayed on the passenger user device, driver user device, and/or rideshare vehicle. In another embodiment, the rideshare parking space management and assignment computer system may assign display labels in a manner that prevents multiple parking spaces within a specified geographic area or distance from having the same display label, while allowing multiple parking spaces outside a specified geographic area or distance to have the same display label.

Figure 3:
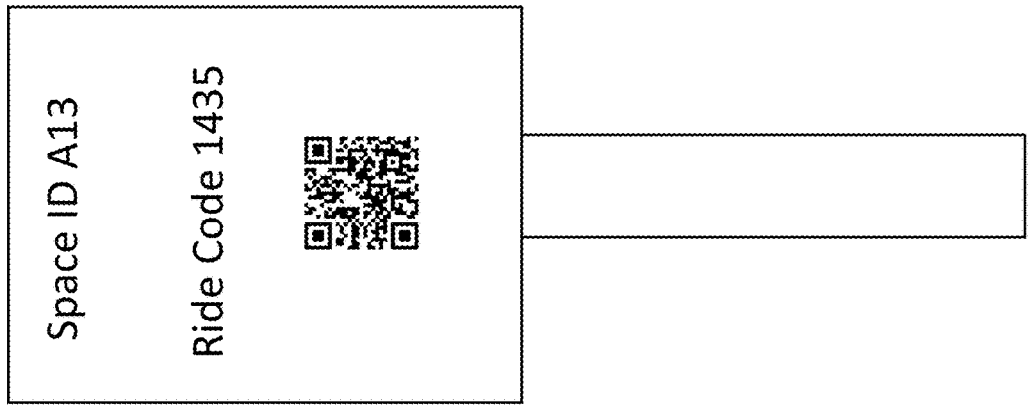
FIG. 3 shows a sign for a rideshare vehicle space including a space ID and a ride code according to one embodiment of the present disclosure.
Figure 4:
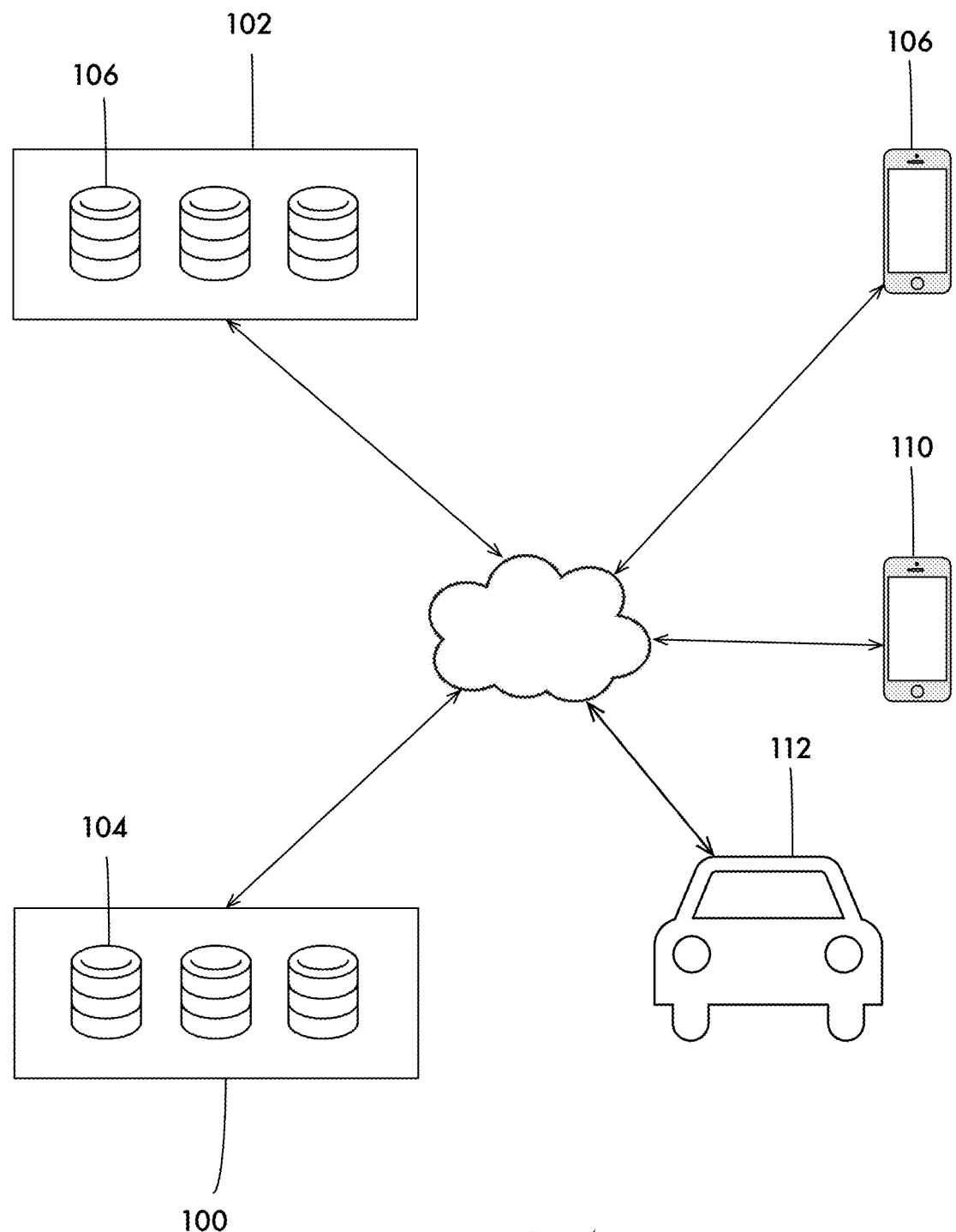
FIG. 4 shows a diagram of a system for managing rideshare parking spaces according to one embodiment of the present disclosure.

In one embodiment, one or more designated and individually labeled parking spaces may be provided for use by rideshare vehicles. The one or more parking spaces may include a visual label such as an alphanumeric, QR code, or other label designated on a physical sign associated with each of the one or more parking spaces. The visual label may be a static sign, such as a number painted onto or adjacent to the parking space. Alternatively, the visual label may be a dynamic sign, such as an electronic sign capable of displaying different labels for different rideshare trips, rideshare drivers, rideshare vehicles, or rideshare passengers. A dynamic electronic sign may also display a ride code specific to a specific rideshare trip, as shown in FIG. 3. This ride code may be generated by the rideshare company or may be generated by the rideshare parking space management and assignment computer system. Additionally, electronic signs may be provided adjacent or in proximity to the one or more parking spaces to alert a driver of the ridesharing vehicle or the rideshare vehicle itself that the vehicle is in a proper or improper parking space. The display may include a designation that a space is reserved for a ridesharing vehicle that is anticipated to arrive at a later time. Sign displays may further include a readable code or may be in electronic communication with the vehicle or driver user device or vehicle itself to aid in locating the designated space and vehicle positioning within the space and confirming that the vehicle is in the space designated for that rideshare trip. The parking space label may also be displayed on the passenger user device, allowing the passenger to easily find and confirm their rideshare at the designated parking space.

In a further embodiment, a virtual label may be used to identify the designated rideshare parking space. For example, rather than physical signage associated with the one or more parking spaces, a virtual label and/or the geolocation of the parking space and/or augmented reality visualization may be utilized to assist the driver and/or rideshare vehicle and the passenger in meeting. In this embodiment the location of the parking space may be transmitted electronically to the passenger user device, the driver user device, and/or the rideshare vehicle and/or computer system in control of or in communication with rideshare vehicle. Navigation software on the passenger user device, the driver user device, and/or the vehicle may then be used to locate the designated parking space. In one embodiment the navigation software may be embedded in a rideshare company's software application installed on a driver user device and/or passenger user device and/or rideshare vehicle and/or computer system in control of or in communication with rideshare vehicle. In a further embodiment the navigation software may be embedded in a software application installed on a driver user device and/or passenger user device and/or rideshare vehicle and/or computer system in control of or in communication with rideshare vehicle in communication with the rideshare parking space management and assignment computer system. In another embodiment the navigation software may be a third-party software application or other software installed on a driver user device and/or passenger user device and/or rideshare vehicle and/or computer system in control of or in communication with rideshare vehicle In one embodiment, the physical sign corresponding to a rideshare parking space may include a readable code or label that may be read by the passenger user device. When the code or label is read by the passenger user device, the passenger user device may send an electronic communication to the rideshare company's computers and/or servers which manage and assign rideshares and transmit the passenger location to the rideshare driver and/or rideshare vehicle. In a further embodiment, when the code or label on the rideshare parking space is read by the passenger user device, a rideshare request from that location may be automatically submitted to the rideshare company's computers and/or servers which manage and assign rideshares. In an additional embodiment, the rideshare parking space sign may be in electronic communication with the passenger user device (such as by near-field communication). In a further embodiment the passenger may manually enter the parking space code or label into the passenger device and that space code or label may then be communicated electronically from the passenger device to the rideshare company's computers and/or servers which manage and assign rideshares and transmit the passenger location to the rideshare driver and/or rideshare vehicle.

In another embodiment, the designated pick-up space may be recognized using geolocation of the user device in electronic communication with the rideshare parking space management and assignment system, and the designated space may then be communicated electronically to the rideshare company's computers and/or servers which manage and assign rideshares and transmit the passenger location to the rideshare driver and/or rideshare vehicle. The rideshare parking space sign may communicate with the passenger user device to confirm an identity and/or location of the passenger to the rideshare driver user device or rideshare vehicle, or to initiate a rideshare request to the rideshare company computer. In another embodiment the driver may manually enter the parking space code or label into the driver device and that space code or label may then be communicated electronically from the driver device to the rideshare company's computers and/or servers which manage and assign rideshares and transmit the driver location to the passenger's user device. In a further embodiment the designated pick-up space may be recognized using geolocation of the rideshare driver device or rideshare vehicle which is in electronic communication with the rideshare parking space management and assignment system, and the designated space may then be communicated electronically to the rideshare company's computers and/or servers which manage and assign rideshares and transmit the driver location to the rideshare passenger. The rideshare parking space sign may communicate with the driver user device or the rideshare vehicle and communicate the location or identity of the rideshare vehicle to the passenger user device through electronic communication with the rideshare company's computers and/or servers which manage and assign rideshares.

The one or more designated, individually assigned, and labeled rideshare parking spaces may be preferably located at a location of public interest, such as where a plurality of ridesharing services operate to pick-up and drop-off passengers. Exemplary locations include airports, train or subway stations, malls, sporting venues, movie theaters, concert halls, movie theaters, and restaurants. The foregoing list is not intended to be exhaustive, and other additional locations may be preferred to implementations of embodiments described herein. In these locations a plurality of rideshare drop-off and pick-up events may occur simultaneously in a relatively small physical location. Multiple, simultaneous rideshare pick-up and drop-off events in close proximity to one another may cause significant difficulty for passengers and their rideshare vehicles to meet without utilizing designated, individually assigned, and labeled parking spaces. Additionally, multiple simultaneous rideshare pick-up and drop-off events in close proximity to one another could may significant traffic disruptions without utilizing designated, individually assigned, and labeled parking spaces.

The location of interest may include one or more designated, labeled, and individually assigned parking spaces for rideshare pick-up and drop-off in a parking area or pick-up and drop-off zone that is separate from other parking areas and pick-up and drop-off zones of the location of interest, or the designated, labeled, and individually assigned parking spaces for rideshare pick-up and drop-off may be integrated as part of a general parking areas and pick-up and drop-off zones of the location of interest. For example, designated ridesharing lots can currently be found at some areas of general public interest, such as airports and sporting venues. However, these lots do not include designated, labeled, and individually assigned parking spaces for rideshare pickup and drop-off. Therefore, significant difficulties may arise in these generalized rideshare lots at busy times, including inability for passengers and their rideshare vehicles to meet in larger rideshare lots, and inability of rideshare drivers and vehicles to find an available parking space in the rideshare lot in which to await their passenger. Designated, labeled, and individually assigned parking spaces may also be located along a street, in an open-air parking lot, or within all or a portion of a parking garage. Suitable designated, labeled, and individually assigned parking spaces may also include designated portions of a pick-up or drop-off lane or zone at an airport terminal or train station. In another embodiment, various locations such as bus stop areas or other restricted spaces may designated as labeled and individually assigned parking spaces for ridesharing vehicles at particular dates and times. In one embodiment, the rideshare parking space management and assignment system is in communication with published bus or streetcar schedules to allow designated parking spaces to be available in bus stop or streetcar areas when buses or streetcars are not using those areas.

Designated individual parking space indicators may include a variety of visual indicia displayed either statically or on a dynamic electronic display. Visual indicia can include a simple number or letter code (or combination thereof) displayed on or adjacent to the parking space. A parking space indicator may alternatively include other information corresponding to a location of a particular parking space, such as a lot, row, and parking space number within a parking lot (e.g., Lot A, Row 13, Space 23). Other information provided to the passenger on the passenger user device to identify a location of the ridesharing vehicle may include information corresponding to a location of the vehicle in a parking garage (such as a floor of the parking garage, row number, and parking space number) or information corresponding to a location at an airport or train station terminal (such as terminal number, door number, etc.).

Designated individual parking space indicators may also be separate from the passenger user device, such as a dynamic electronic display which displays multiple rideshare codes and/or rideshare passenger names and/or other rideshare passenger identifiers along with the designated parking space label. Such a display may be located, for example, at the exit of an airport or train terminal or at the entrance of a parking lot.

Systems and embodiments described herein preferably automate a process of allowing a passenger and driver of a ridesharing vehicle to locate one another and for the allocation of available, designated parking spaces for rideshare vehicle pick-up and drop-off. In one preferable embodiment, data corresponding to locations of specific parking spaces designated for use by rideshare vehicles during pick-up and drop-off is stored on a central computer or database that is integrated with or in electronic communication with or otherwise accessible by computers and/or servers of a plurality of rideshare companies. Additionally, one or more computers and/or servers are preferably in communication with computers and/or servers of the ridesharing entities for facilitating the assignment of designated, labeled parking spaces to specific rideshare trips based on location and availability of parking spaces in the rideshare parking space database to the requested pick-up and drop-off location of the requested rideshare trip. Other factors may be considered in the assignment of parking spaces to a specific rideshare trip, including but not limited to fees associated with parking spaces, specific airport or train station terminals for departing or arriving rideshare passengers, exit or entrance doors of airport or train station terminals, rules or characteristics associated with a specific parking space, time and day of rideshare pick-up or drop-off, passenger seat or gate at a sports or concert venue, regulations/laws of roadways in proximity to the requested pick-up or drop-off locations, anticipated direction of travel during rideshare from pick-up or drop-off location, current direction of travel of driver passenger, and/or regulations/laws associated with the parking spaces themselves. In a further embodiment the designated pick-up space may match the designated drop-off space of the rideshare driver's or vehicle's prior rideshare trip to allow the vehicle to remain in the same designated space for the next rideshare trip. Additionally, one or more computers and/or servers are preferably in communication with computers and/or servers of the ridesharing companies for facilitating confirmation of the identity of a ridesharing vehicle by a passenger. Computers and/or servers of the present embodiment may be in direct electronic communication with servers of the plurality of ridesharing companies. Alternatively, data corresponding to designated parking spaces for ridesharing vehicles and associated computer and software systems for the assignment and management of such parking spaces may be provided to or accessed by a plurality of ridesharing companies, such as through an Application Programming Interface (API). Additionally, data corresponding to individual or multiple parking spaces for ridesharing vehicles and computer and/or software for the management and assignment of rideshare vehicle parking spaces may be stored within the computers and servers of ridesharing companies. The rideshare parking space assignment and management computer system and associated software and databases may therefore be separate from but in communication with the computer system, servers, and software of ridesharing companies, or they may be integrated into the computer system, servers, and software of ridesharing companies.

Embodiments of the present disclosure may include electronic databases of businesses, places of interest, residences, and/or street addresses and related designated rideshare parking spaces. In this embodiment, a passenger may enter a business name, place of interest name, residence, or street address in the passenger user device as a pick-up or drop-off location for a rideshare, and the rideshare parking space management and assignment system may automatically assign a designated rideshare parking space for pick-up or drop-off from a database table of rideshare parking spaces related to that business, place of interest, residence, or street address. In a further embodiment a single designated rideshare parking space may be associated with multiple businesses, places of interest, residences, and/or street addresses. In another embodiment a business, places of interest, residences, and/or street addresses may be associated with multiple designated rideshare parking spaces.

Embodiments of the present disclosure further include a software application that is operable on one or both of a passenger user device and a driver user device, such as a smartphone of the driver and passenger. The software application may also be operable on a rideshare vehicle or remote computers in control of or in communication with a rideshare vehicle. The driver and/or passenger user devices and/or vehicle may include a display and one or more input devices, such as a touchscreen for receiving input from a user. The software application may be downloadable a software application installed on the driver and passenger user devices and/or vehicle. Currently, rideshare vehicle drivers may call or text a passenger to provide a precise location of a pick-up or a specific parking space label. This practice is hazardous as it requires the rideshare driver to operate their communication device while operating their vehicle. Additionally, this practice is inconvenient for both the driver and passenger as it requires use of an application on their device (text or voice call) while they may be using another application (such as an application of a transportation network company or mapping/navigation application). In one embodiment of the present disclosure, the label identification of the parking space designated for the specific rideshare trip may be automatically displayed on the software application of the ridesharing companies in use by the driver and passenger.

In an additional embodiment, a software application in communication with the rideshare parking space database and rideshare parking space management and assignment computer system which is separate from the rideshare company software application and installed on the passenger user device, driver user device, and/or rideshare vehicle or computer system in control of or in communication with the rideshare vehicle may be used to display the label identification of the parking space designated for the specific rideshare trip. In another embodiment, the label identification of the parking space designated for the specific rideshare may be automatically displayed on a mapping/navigation software application in use on the driver user device, vehicle or computer system in control of or in communication with the vehicle, and/or passenger user device. In an additional embodiment, elements of systems and methods described herein may be implemented using automated transmitted SMS or text messages to the passenger and driver devices. Alternatively, the software may be web-based and accessible via a browser of the passenger and driver user devices and/or vehicle or computer system in control of or in communication with the vehicle or through a separate software application on the passenger and driver user devices. Additionally, the software may be operable on an autonomous or human-driven rideshare vehicle or in communication with an autonomous or human-driven rideshare vehicle or remote computers in control of or in communication with a rideshare vehicle.

In a further embodiment the driver may manually input the label of a parking space using rideshare company software application on the driver user device, and the manually inputted code by the driver will be displayed on the rideshare company software application on the passenger user device or be transmitted by SMS or text message or voice call to the passenger user device.

In one embodiment, the driver or passenger may request a specific, labeled rideshare pick-up or drop-off designated rideshare parking space for a specified rideshare trip. In a further embodiment, this request may be made using the rideshare company software application on the driver user device or passenger user device.

In an additional embodiment, the pick-up parking space label and location may be transmitted to the passenger user device after the driver and/or vehicle arrive at the pick-up parking space rather than at the time the ride request is initiated by the passenger.

In one embodiment, software on the driver user device includes a navigation component for guiding a driver of the ridesharing vehicle to a designated parking spot for picking up and dropping off a passenger. Navigation instructions are displayed on the display of the driver user device to enable the driver to navigate to a designated parking space for pick-up and drop-off of the passenger. In one embodiment the navigation instructions may be displayed on a rideshare company's software application. In another embodiment the navigation instructions may be displayed on an application in communication with the rideshare parking space management and assignment computer system. In a further embodiment, navigation instructions to and/or geolocation of the designated parking space may be automatically entered or communicated to a navigation system of a ridesharing vehicle, such as an autonomous vehicle, or to a remote computer system in control of or in communication with a rideshare vehicle, such that the vehicle automatically navigates to the designated parking space. In another embodiment, the geolocation of a designated parking space for passenger pick-up or drop-off may be automatically entered or communicated to a separate mapping and/or navigation application on the driver's communication device. Similarly, in one embodiment the passenger device also includes a navigation component for guiding a passenger to a designated parking spot for pick-up by the ridesharing vehicle. Navigation instructions may be displayed on the passenger device for guiding a passenger to the designated parking space of the ridesharing vehicle. In one embodiment the navigation instructions may be displayed on a rideshare company's software application. In another embodiment the navigation instructions may be displayed on an application in communication with the rideshare parking space management and assignment computer system. Alternatively, the geolocation of a designated parking space for passenger pickup may be automatically entered or communicated to a separate mapping and/or navigation application on the passenger's communication device. In another embodiment, a location of the ridesharing vehicle may be shown on the display of the passenger device such as by using augmented reality. A camera of the passenger device may be activated, and a direction or location of the ridesharing vehicle may be shown over images captured by the camera of the passenger device such that the passenger may locate the designated parking space of their ridesharing vehicle.

Embodiments of the system and method described herein may include recognition of whether a designated parking space is open/available, and also whether the correct vehicle is in the designated parking space. In one embodiment, one or more sensors are located at or near the one or more parking spaces for confirming that a correct vehicle is located at a particular space. For example, a bar code, NFC device, or other like sensor may be used to determine whether a ridesharing vehicle is located in an appropriate parking space. In another embodiment, the geolocation of the rideshare vehicle is submitted to the rideshare parking space management and assignment computer system and the rideshare parking space management and assignment computer system cross-references the geolocation of the vehicle against the geolocation of the designated parking space in the parking space database. Embodiments also include a sensor at or near a designated parking space to determine whether another vehicle or object is in the designated parking space. For example, a sensor may be used to determine if a non-rideshare vehicle, or a rideshare vehicle not authorized to utilize that space, is currently occupying the designated parking space. The driver device or rideshare vehicle is preferably in electronic communication with one or more servers for receiving information related to availability of parking spaces or an assigned parking space for picking up and dropping off a passenger with the ridesharing vehicle. Embodiments further include receiving GPS data from the driver device or vehicle to determine whether the ridesharing vehicle has departed the parking space. In one embodiment, if a designated parking space is determined to become occupied or unavailable, the rideshare parking space management and assignment system may automatically reassign a specific rideshare to another designated parking space. The reassigned designated parking space may be chosen based on one or many factors, including, but not limited to, proximity to the original assigned parking space and direction of travel of the roadway associated with the original or reassigned parking space. If an assigned parking space is reassigned, information regarding the updated parking space is displayed on both the passenger and driver devices. Similarly, if an assigned parking space is reassigned, information regarding the updated parking space is electronically communicated to the control system of an autonomous rideshare vehicle.

Systems and methods herein may further include queuing vehicles awaiting use of a designated, labeled, assigned parking space. In one embodiment, designated parking spaces may be assigned to rideshare vehicles in the order of the time in which a rideshare is requested. In another embodiment, the designated parking space may be assigned to rideshare vehicles in an order based on the estimated time of the rideshare pick-up or drop-off or the distance between the rideshare vehicle and the designated parking space. In this embodiment a designated parking space assigned to a first rideshare vehicle may also be assigned to be used first by a second rideshare vehicle if the second rideshare is estimated to arrive and depart the designated parking space prior to the first rideshare vehicle. In an additional embodiment, the anticipated queue wait time may be made available to and/or displayed on the user device of the driver or passenger or on/in the rideshare vehicle. In one embodiment, the anticipated queue wait time is displayed on the rideshare company software application on the driver device or user device or on/in the rideshare vehicle. In a further embodiment, the designated rideshare parking space management and assignment computer system may re-assign a designated rideshare parking space automatically if the queue is longer than a specified time or manually if the passenger or driver or vehicle requests a new designated parking space while queueing or when the queue time is displayed on their user device or otherwise made available. In one embodiment, the manual request for space reassignment may be made using the software application of the rideshare company on the driver user device or passenger user device.

In one embodiment, a visual indicator is included on a dynamic display associated with the parking space for indicating whether an appropriate ridesharing vehicle is located within the parking space. For example, using GPS or one or more sensors located at the parking space, a vehicle within a particular parking space is identified. If the vehicle matches a ridesharing vehicle and location provided to a passenger requesting the ridesharing vehicle, the visual indicator indicates to the passenger that a correct vehicle is located in the parking space. If the vehicle does not match the vehicle requested by the passenger, the visual indicator indicates to the passenger that the vehicle is not the passenger's requested rideshare vehicle. In another embodiment, an indicator is transmitted to a passenger user device to confirm that the correct vehicle is located in the designated parking space.

As described herein, dynamic display associated with a parking space may further display whether a space is reserved for an inbound ridesharing vehicle. For example, if a passenger has requested a ridesharing vehicle and has been provided a designated parking space for pick-up by the ridesharing vehicle, a display associated with the parking space indicates to other drivers and/or rideshare vehicles that the parking space is reserved for the passenger's ridesharing vehicle. If a vehicle is determined to be parked within the parking space after requesting the ridesharing vehicle, an assigned parking space may be automatically reassigned and information regarding the updated parking space displayed on both the passenger and driver. Similarly, if a vehicle is determined to be parked within the parking space after requesting the ridesharing vehicle, an assigned parking space may be automatically reassigned and information regarding the updated parking space to to the rideshare vehicle or computer in communication with or in control of the rideshare vehicle. In another embodiment, one or more ridesharing vehicles may be queued for parking spaces when no parking spaces are determined to be available.

In one embodiment, a geofenced area may be designated wherein a rideshare vehicle can only pickup or drop off passengers if utilizing a designated, assigned, labeled parking space. Pickup and drop offs would be prohibited in any other areas or parking spaces within the geofenced area. A geofenced area may include, for example, an area around an airport or other location of interest.

Embodiments of the system and method described herein may further include the creation of individual or multiple ridesharing parking spaces, such as by a private or governmental owner or manager of a parking area or roadway. In one embodiment, such a user may utilize a user device to define coordinates around a parking space for use by a ridesharing vehicle. The user may enter coordinates or otherwise utilize GPS of a user device to locate boundaries of a parking space. The user may subsequently input preferences and information related to the parking space, such as days and hours of availability, associated street address(es), associated businesses, associated residences, associated places of interest, lot number/letter, row number/letter, parking garage floor designation, and information corresponding to a location at an airport or train station terminal such as terminal number, door number, etc. The user may then submit the geolocation of the boundaries and other information related to the parking space to the rideshare vehicle parking space database. In one embodiment, the rideshare parking space management and assignment system software automatically assigns master and display labels or identification codes to the user-submitted parking space in the rideshare vehicle parking space database. In another embodiment, the rideshare parking space management and assignment system software automatically assigns master label or identification code to the user-submitted parking space in the rideshare vehicle parking space database, but the user assigns a display label or identification code to the user-submitted parking space. In a further embodiment the user may assign one or multiple designated rideshare parking spaces to specified street address(es), associated business(es), associated residence(s), or associated place(s) of interest.

Designated, assigned parking spaces within a specified area may dynamically be made available or unavailable based on demand for rideshare pick-up or drop-offs in a specified area. Additionally, designated, assigned parking spaces may be made available or unavailable either automatically or manually based on date or time. For example, a governmental user may create a row of rideshare vehicle designated rideshare parking spaces along part of a roadway. During certain days or times of the week the parking spaces may be unavailable for rideshare pick-ups and drop-offs and that portion of the roadway may be used for commuting traffic. During other days or times of the week the parking spaces may be made available for rideshare pick-ups and drop-off and that portion of the roadway may be made unavailable for commuting traffic.

Data associated with usage of a designated parking space may further be collected for determining the number of times and/or the amount of time a parking space is used by a ridesharing vehicle or made available for a ridesharing vehicle. Additional data may be collected such as an amount paid by the passenger for utilizing the ridesharing vehicle. This data may be used to calculate a portion of revenue for the owner of the parking space collected by ridesharing companies utilizing the parking space. This data may also be used to calculate a fee charged or paid to the ridesharing company using the parking space, a fee charged or paid to the owner/manager of the parking space, a fee charged or paid to a business or place of interest associated with a parking space, or a fee charged to the rideshare passenger.

In one embodiment, a designated rideshare parking space may be made available for a rideshare trip only if the passenger selects a business or place of interest associated with that parking space as a pick-up or drop-off destination. In a further embodiment, a designated rideshare parking space may only be made available for a rideshare trip if a passenger or driver has a user code which may be input into the software application of the rideshare company. In another embodiment, a business or place of interest may pay or charge a fee for use of a designated parking space.

In one embodiment, fees associated with usage of a designated parking space may be automatically increased or decreased based on demand for parking spaces in the area of the designated parking space. Additionally, passengers requesting a pick-up or drop-off may be offered multiple pick-up or drop-off parking spaces with different prices based upon location.

In one embodiment fees may be charged to a transport network company based on usage of designated rideshare parking spaces. In another embodiment fees may be charged to a passenger based on usage of designated rideshare parking spaces. In a further embodiment fees may be charged to a business, residence, or place of interest based on usage of a designated rideshare parking space.

In one embodiment the rideshare parking space management and assignment system may select multiple potential designated parking spaces for pick-up and drop-off and present them to the passenger using a display on the passenger device. The passenger may then use their passenger device to select a single pick-up and drop-off parking space from the presented list. The selected pick-up and drop-off parking spaces are then communicated to the rideshare driver and/or rideshare vehicle. In a further embodiment, the rideshare parking space management and assignment system may select multiple potential designated parking spaces for pick-up and drop-off and present them to the rideshare driver and/or rideshare vehicle using a display on the driver device or vehicle or to a remote computer system in control of or in communication with a rideshare vehicle.

In one embodiment the rideshare parking space management and assignment system may designate a single pick-up and/or drop-off space for multiple separate rideshare trips, thereby combining them into a single "carpool" trip.

In one embodiment the rideshare parking space management and assignment system may assign any passenger-requested rideshare pick-up or drop-off within a specified geographic area to one or more designated pick-up or drop-off spaces within or outside that specified area.

In one embodiment the driver or rideshare vehicle or remote computer system in control of or in communication with a rideshare vehicle may travel to an area in proximity to the designated pick-up or drop-off space using GPS, but then use visual recognition of a label or line markings for final positioning within the designated space. In another embodiment the driver or rideshare vehicle or remote computer system in control of or in communication with a rideshare vehicle may travel to an area in proximity to the designated pick-up or drop-off space using GPS, but then use electronic communication with a physical sign or other physical device associated with the space for final positioning within the designated space.

Figure 5:
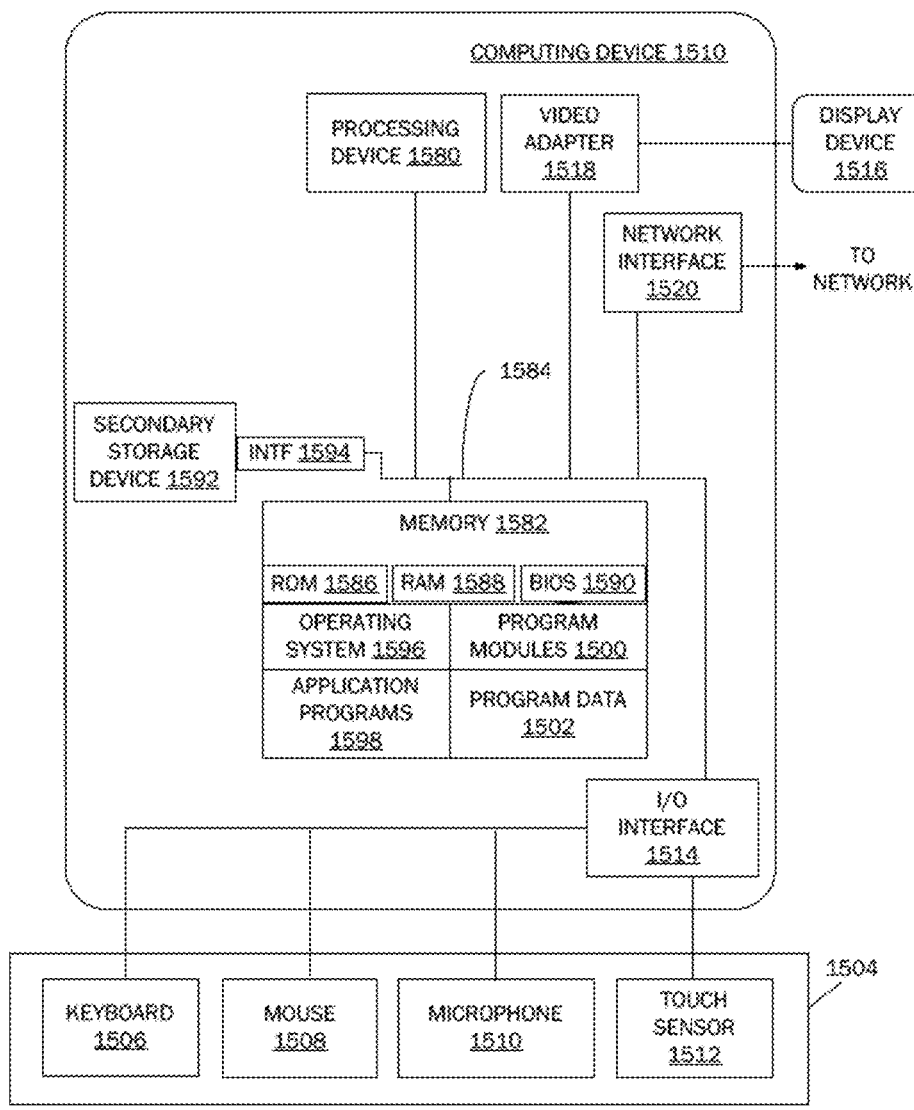
FIG. 5 shows a schematic of a computing device according to one embodiment of the present disclosure.

Referring to FIG. 5, embodiments herein include a parking space management server 100 in communication with a rideshare entity server 102 or other third party server. Data stored on one or more databases 104 associated with the parking space management server 100, such as data corresponding to one or more parking spaces available for use for a rideshare vehicle, may be transmitted to and received from the rideshare entity server 102. Data stored on one or more databases 106 associated with the rideshare entity server 102 may similarly be transmitted to and received from the parking space management server 100. Data from the parking space management server 100 and the rideshare entity server 102 may be sent to and received from a user device 108, and driver device 110, an autonomous vehicle 112, and other various devices in over a communications network.

Referring now to FIG. 5, an exemplary architecture of a computing device that can be used to implement aspects of the present disclosure is illustrated, such as the user device, driver device, rideshare parking space management server, third party server, and other devices and servers disclosed herein. The computing device illustrated in FIG. 5 can be used to execute the operating system, application programs, and software modules (including the software engines) described herein.

The computing device 1510 includes, in some embodiments, at least one processing device 1580, such as a central processing unit (CPU). A variety of processing devices are available from a variety of manufacturers, for example, Intel or Advanced Micro Devices. In this example, the computing device 1510 also includes a system memory 1582, and a system bus 1584 that couples various system components including the system memory 1582 to the processing device 1580. The system bus 1584 is one of any number of types of bus structures including a memory bus, or memory controller; a peripheral bus; and a local bus using any of a variety of bus architectures.

Examples of computing devices suitable for the computing device 1510 include a desktop computer, a laptop computer, a tablet computer, a mobile computing device (such as a smart phone, a tablet device, or other mobile devices), or other devices configured to process digital instructions.

The system memory 1582 includes read only memory 1586 and random access memory 1588. A basic input/output system 1590 containing the basic routines that act to transfer information within computing device 1510, such as during start up, is typically stored in the read only memory 1586.

The computing device 1510 also includes a secondary storage device 1592 in some embodiments, such as a hard disk drive, for storing digital data. The secondary storage device 1592 is connected to the system bus 1584 by a secondary storage interface 1594. The secondary storage devices 1592 and their associated computer readable media provide nonvolatile storage of computer readable instructions (including application programs and program modules), data structures, and other data for the computing device 1510.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 1592 or memory 1582, including an operating system 1596, one or more application programs 1598, other program modules 1500 (such as the software engines described herein), and program data 1502. The computing device 1510 can utilize any suitable operating system, such as Microsoft Windows™, Google Chrome™, Apple OS, and any other operating system suitable for a computing device. Other examples can include Microsoft, Google, or Apple operating systems, or any other suitable operating system used in tablet computing devices.

In some embodiments, a user provides inputs to the computing device 1510 through one or more input devices 1504. Examples of input devices 1504 include a keyboard 1506, mouse 1508, microphone 1510, and touch sensor 1512 (such as a touchpad or touch sensitive display). Other embodiments include other input devices 1504. The input devices are often connected to the processing device 1580 through an input/output interface 1514 that is coupled to the system bus 1584. These input devices 1504 can be connected by any number of input/output interfaces, such as a parallel port, serial port, game port, or a universal serial bus. Wireless communication between input devices and the interface 1514 is possible as well, and includes infrared, BLUETOOTH® wireless technology, 802.11a/b/g/n, cellular, or other radio frequency communication systems in some possible embodiments.

In this example embodiment, a display device 1516, such as a monitor, liquid crystal display device, projector, or touch sensitive display device, is also connected to the system bus 1584 via an interface, such as a video adapter 1518. In addition to the display device 1516, the computing device 1510 can include various other peripheral devices (not shown), such as speakers or a printer.

When used in a local area networking environment or a wide area networking environment (such as the Internet), the computing device 1510 is typically connected to a network through a network interface 1520, such as an Ethernet interface. Other possible embodiments use other communication devices. For example, some embodiments of the computing device 1510 include a modem for communicating across the network.

The computing device 1510 typically includes at least some form of computer readable media. Computer readable media includes any available media that can be accessed by the computing device 1510. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1510.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 5 is also an example of programmable electronics, which may include one or more such computing devices, and when multiple computing devices are included, such computing devices can be coupled together with a suitable data communication network so as to collectively perform the various functions, methods, or operations disclosed herein.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A method of assigning a unique parking space identifier to a rideshare vehicle and rideshare passenger, the method comprising:
   providing a rideshare parking space management server having a processor and memory;
   providing a database including data corresponding to at least one parking space available for use by a rideshare vehicle on the memory of the rideshare parking space management server;
   receiving on the rideshare parking space management server a request for one of a pick-up or drop-off of a rideshare passenger from one of a passenger device, driver device, autonomous rideshare vehicle, or rideshare server;

in response to receiving, on the rideshare parking space management server, the request for one of a pick-up or drop-off of a rideshare passenger, assigning with the processor of the rideshare parking space management server one of the at least one parking space to the rideshare vehicle;

transmitting from the rideshare parking space management server a unique parking space code corresponding to the parking space assigned to the rideshare vehicle to one of a driver device, the autonomous rideshare vehicle, or rideshare server in communication with the rideshare parking space management server;

in response to assigning one of the at least one parking space to the rideshare vehicle, transmitting the unique parking space code corresponding to the assigned parking space to a passenger device in communication with the rideshare parking space management server;

displaying the unique parking space code transmitted to the passenger device on a display of the passenger device; and displaying the unique parking space code on a dynamic electronic sign located proximate to the parking space assigned to the rideshare vehicle corresponding to the request for one of a pick-up and drop-off of the rideshare passenger, wherein the unique parking space code displayed on the dynamic electronic sign located proximate to the parking space assigned to the rideshare vehicle matches the unique parking space code displayed on the passenger device, reading, by one or more sensors of the rideshare vehicle, the unique parking space code; and in response to reading the unique parking space code, confirming the rideshare vehicle is in the parking space assigned to the rideshare vehicle corresponding to the request for the one of a pick-up and drop-off of the rideshare passenger.

2. The method of claim 1, further comprising:
a rideshare provider server in electronic communication with the rideshare parking space management server;
wherein transmission of the unique parking space code corresponding to the assigned parking space to one of the driver device, the autonomous rideshare vehicle, or the rideshare server and transmission of the parking space code to the passenger device is via the rideshare provider server.

3. The method of claim 1, further comprising data corresponding to a plurality of rideshare parking spaces, wherein the processor of the rideshare parking space management server assigns one of the plurality of rideshare parking spaces to the rideshare vehicle corresponding to the request.

4. The method of claim 2, wherein assigning with the processor one of the at least one parking space to the rideshare vehicle corresponding to the request for one of a pick-up or drop-off of the rideshare passenger and transmitting with the processor the parking space code is performed on the rideshare provider server.

5. The method of claim 1, wherein a location of the assigned parking space is transmitted to the one of the driver device, the autonomous rideshare vehicle, or the rideshare server, wherein the location corresponds to a physical location of the assigned parking space.

6. The method of claim 1, further comprising receiving data on the rideshare parking space management server corresponding to characteristics of the at least one parking space selected from the group consisting of at least one of dates of availability of the at least one parking space, times of availability of the at least one parking space, geographic location of the at least one parking space, a street address of the at least one parking space, proximity of the at least one parking space to businesses, proximity of the at least one parking space to residences, one of a lot number and letter, one of a row number and letter, parking garage floor designation, and information corresponding to a location at an airport or train station terminal, wherein assignment of the at least one parking space is based on one of the dates of availability, times of availability, and geographic location of the at least one parking space.

7. The method of claim 1, further comprising assigning a master label to the assigned parking space and assigning a display label to the assigned parking space, wherein the display label has a character length that is less than a character length of the master label.

8. The method of claim 7, wherein the master label is uniquely associated with the assigned parking space and wherein the display label may be used on a second assigned parking space.

9. The method of claim 8, wherein the same display label is associated with a first of the assigned parking space and the second assigned parking space when the second parking space is determined to be in a different geographic location from the first of the assigned parking space.

10. The method of claim 1, further comprising determining a route to the assigned parking space for the ride-share vehicle.

11. The method of claim 1, further comprising providing a user interface for receiving location information of a parking space entered by a user and storing data of the received parking space on the database on the rideshare parking space management server.

12. The method of claim 11, further comprising receiving availability data of the received parking space, the availability data selected from the group consisting of days of availability, times of availability, businesses located in proximity to the received parking space, and a label associated with the received parking space.

13. The method of claim 1, wherein the unique parking space code of the at least one parking space assigned to the ride-share vehicle is transmitted to both a first user device corresponding to a first passenger user and a second user device corresponding to a second passenger user.

14. The method of claim 1, further comprising storing data corresponding to a fee in association with the at least one parking space available for use by the rideshare vehicle.

* * * * *